(12) United States Patent
Corell et al.

(10) Patent No.: US 7,472,398 B2
(45) Date of Patent: Dec. 30, 2008

(54) METHOD AND SYSTEM FOR HOSTING AN APPLICATION WITH A FACADE SERVER

(75) Inventors: Brian J. Corell, Houston, TX (US); Keith R. Kinnan, Cypress, TX (US); Balaji Natrajan, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 748 days.

(21) Appl. No.: 10/715,250

(22) Filed: Nov. 17, 2003

(65) Prior Publication Data

US 2005/0108731 A1    May 19, 2005

(51) Int. Cl.
*G06F 9/44* (2006.01)
(52) U.S. Cl. .................. 719/328; 719/311; 709/230
(58) Field of Classification Search .......... 719/312, 719/328, 310, 311; 709/203, 229, 230
See application file for complete search history.

(56) References Cited

U.S. PATENT DOCUMENTS

| | | | | |
|---|---|---|---|---|
| 5,566,302 A | * | 10/1996 | Khalidi et al. | 719/312 |
| 5,682,534 A | * | 10/1997 | Kapoor et al. | 719/328 |
| 6,192,395 B1 | * | 2/2001 | Lerner et al. | 709/204 |
| 6,195,694 B1 | * | 2/2001 | Chen et al. | 709/220 |
| 6,717,593 B1 | * | 4/2004 | Jennings | 715/760 |
| 7,346,649 B1 | * | 3/2008 | Wong | 709/203 |
| 2002/0055940 A1 | * | 5/2002 | Elkan | 707/104.1 |
| 2002/0107915 A1 | * | 8/2002 | Ally et al. | 709/203 |
| 2003/0234793 A1 | * | 12/2003 | Stokes et al. | 345/600 |

OTHER PUBLICATIONS

"About Asynchronous Pluggable Protocols"; Copyright 2003 Microsoft Corporation, 8 pp.; [Online] http://msdn.microsoft.com/workshop/networking/pluggable/overview/overview.asp? fram ....
"Application Facades"; Martin Fowler; 27 pp. [Online] http://martinfowler.com/articles.html.

* cited by examiner

*Primary Examiner*—Van H Nguyen

(57) ABSTRACT

One exemplary embodiment may be a system that comprises a central processing unit (CPU), an application, and a facade server. The facade server may host the application without utilizing network protocols. A program executing on the CPU may create an interface between the facade server and a browser for exchanging data associated with the application.

18 Claims, 3 Drawing Sheets

METHOD AND SYSTEM FOR HOSTING AN APPLICATION WITH A FACADE SERVER

BACKGROUND

Some software applications may utilize a computer network, such as the Internet, to exchange application data with a user. The network may comprise a plurality of devices, such as switches, routers, and computer systems, that are coupled together via a network topology, such as Ethernet and Token Ring. A web-server may establish network connections that reliably transfer the application data across the network. The network connections may facilitate the transfer of application data through one or more network protocols, such as transmission control protocol/internet protocol (TCP/IP).

When an application and a user of the application are operating on the same computer system, it may be undesirable to utilize a web-server. The web-server may open computer ports and increase the vulnerability of the computer system that operates the application to computer-based attacks, such as denials of service and buffer overflows. In addition, the web-server may require additional processing that may be unnecessary, such as instantiating the TCP/IP stack.

SUMMARY

One exemplary embodiment may be a system that comprises a central processing unit (CPU), an application, and a facade server. The facade server may host the application without utilizing network protocols. A program executing on the CPU may create an interface between the facade server and a browser for exchanging data associated with the application.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the verb "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. The embodiments disclosed should not be interpreted, or otherwise used, as limiting the scope of the disclosure unless otherwise specified. In addition, one skilled in the art will understand that the following description has broad application, and the discussion of any embodiment is meant only to be exemplary of that embodiment, and not intended to intimate that the scope of the disclosure is limited to that embodiment.

Figure 1:
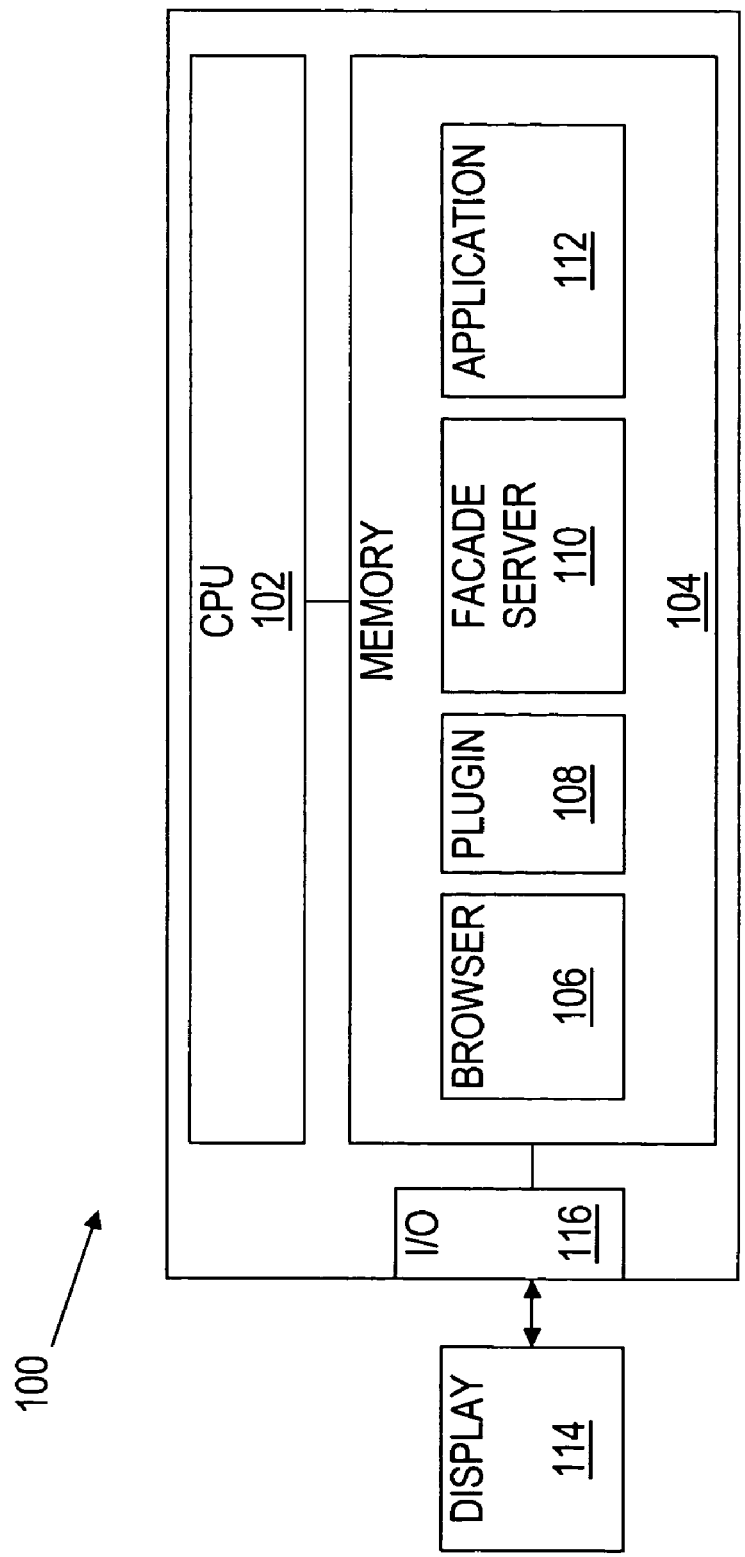
FIG. 1 illustrates a computer system constructed in accordance with embodiments of the invention.

FIG. 1 illustrates a computer system constructed in accordance with embodiments of the invention. System 100 may be any type of computer system, such as a laptop computer, a personal computer, or a stand-alone computer operated as a server. The system may comprise a single central processing unit (CPU) 102, as illustrated in FIG. 1, or may comprise a plurality of CPUs arranged in a configuration where parallel computing may take place. The CPU 102 may couple to a memory 104 that may store a browser 106 program, a plugin 108 program, a facade server 110 program, and an application 112. The memory 104 may comprise volatile memory and/or non-volatile memory, such as random access memory (RAM), read only memory (ROM), and a hard drive.

The application 112 may be any type of web-based application that is capable of being hosted by a web-server, such as Apache®, Tomcat®, and Internet Information Server (IIS®). More specifically, the application 112 may comprise one or more software functions and/or data files (not specifically shown) that may utilize web-based technologies, such as Perl, Java®, active server pages (ASP), hypertext preprocessing (PHP), and/or hypertext markup language (HTML), to generate static and/or dynamic content. The methods and systems described herein relate to one or more web-based applications that are operated by a user on the same computer system that is executing the applications.

The user may interact with the applications without utilizing network protocols, such as TCP/IP and internet packet exchange (IPX), and without opening network ports. The facade server 110 may interact with the application 112 by creating one or more interfaces (not shown in FIG. 1), such as application programming interface (APIs) and common gateway interfaces (CGIs), that may ordinarily be created by a web-server. The interfaces allow the application 112 to communicate with the facade server 110 in a substantially similar manner as the application 112 would communicate with a web-server.

However, the facade server 110 preferably does not use network protocols to communicate with a user of the application 112. Instead, the plugin 108 may exchange application data between the facade server 110 and the browser 106 through a local protocol that is supported by the system 100. The local protocol may facilitate the exchange of data via one or more software component models, such as Component Object Model (COM), named data pipes, memory mapped I/O streams, data files, and other methods of locally transferring data between software components.

The browser 106 may be capable of rendering application data generated by the application 112 onto a display 114 via an input/output (I/O) interface 116. The browser 106 may be any type of web-browser, such as Internet Explorer®, Netscape®, and Mozilla®. The plugin 108 may be a web-browser plugin, such as a dynamic link library (DLL) using the asynchronous pluggable protocol (APP), a Java® applet, or any other type of plugin that may interact with the browser

106. Other components, such as a keyboard and pointing device (not specifically shown), may be included in system 100 as desired.

Figure 2:
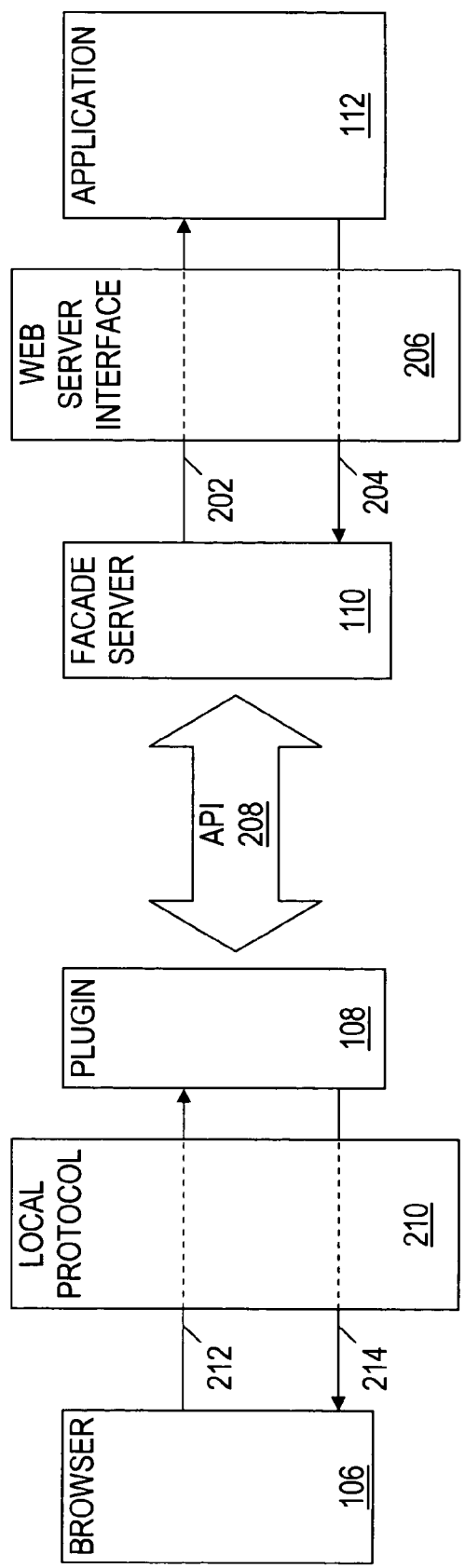
FIG. 2 illustrates an exemplary data flow between components of FIG. 1 in accordance with embodiments of the invention.

Referring now to FIG. 2, an exemplary data flow between the browser 106, the plugin 108, the facade server 110, and the application 112 of FIG. 1 is shown. While being executed by the CPU 102 (FIG. 1), the facade server 110 may send one or more requests 202 to the application 112. Each request 202 may include an input to the one or more software functions associated with the application 112. Upon receiving a request 202, the application 112 may service the request 202 by executing the appropriate software functions on the CPU 102 (FIG. 1) and may generate a corresponding reply 204. The request 202 and corresponding reply 204 are transferred through one or more web-server interfaces 206.

The facade server 110 may be configured to perform the functions associated with a web-server, such as serving webpages, parsing data files, and processing server side includes (SSI), without utilizing network protocols, such as TCP/IP, to transfer application data. Instead, the plugin 108 may interact with the facade server 110 via an application programming interface (API) 208. The API 208 may comprise one or more software functions that facilitate the exchange of application data between the plugin 108 and the facade server 110.

To integrate the plugin 108 with the web browser 106, a local protocol 210 may be registered on the system 100 (FIG. 1). Registering a protocol integrates the protocol scheme and one or more protocol handlers with the browser 106. For example, many external protocols, such as file transfer protocol (FTP) and hypertext transfer protocol (HTTP), may be registered with a browser. The registration of the protocols allows the browser to handle protocol-specific schemes, such as FTP and HTTP. The handler of the protocol may be a program responsible for handling references using the protocol scheme. For example, an FTP reference (e.g., a URL having an "ftp://" scheme, followed by a hostname such as "microsoft," followed by an organization type, such as ".com") may be handled by an FTP dynamic link library (DLL) that attempts to establish an FTP connection with a server (e.g., a commercial server associated with MICROSOFT®).

In accordance with embodiments of the invention, the local protocol 210, having a predetermined scheme, may be registered with the web browser 106 and may designate the plugin 108 as the handler of the predetermined scheme. The web browser 106 may submit a request 212 to the plugin 108 by referencing the registered scheme of the local protocol 210.

The request 212 may include several types of data. The request 212 may include form data that is generated from web-based forms that are rendered by the browser 106, universal resource indicator (URI) data that is generated when a user selects a hyperlink that uses the scheme of the local protocol, or data generated from any other means for exchanging information between a browser and an application through a local protocol. A corresponding reply 214 to the request 212 may be sent from the plugin 108 after the request 212 is processed by the facade server 110 and, if necessary, the application 112.

In alternative embodiments, the plugin 108, the facade server 110, and the application 112 may be combined into a single component that is executed by the CPU 108 when the local protocol 210 is referenced by the web browser 106. The plugin 108, the facade server 110, and the application 112 may remain distinct, utilizing different address spaces, or be combined to use a common address space.

In other embodiments, the web server interface 206 may comprise a plurality of interfaces that mimic various types of web-servers, such as Tomcat®, Apache®, and IIS®. To an application being hosted by the facade server 110, the web-server interface 206 may interact with the application in a substantially similar manner as the application would interact with the web-server being mimicked. Thus, multiple protocol handlers may be registered in the system 100, one for each type of web-server being mimicked by the web server interface 206.

Figure 3:
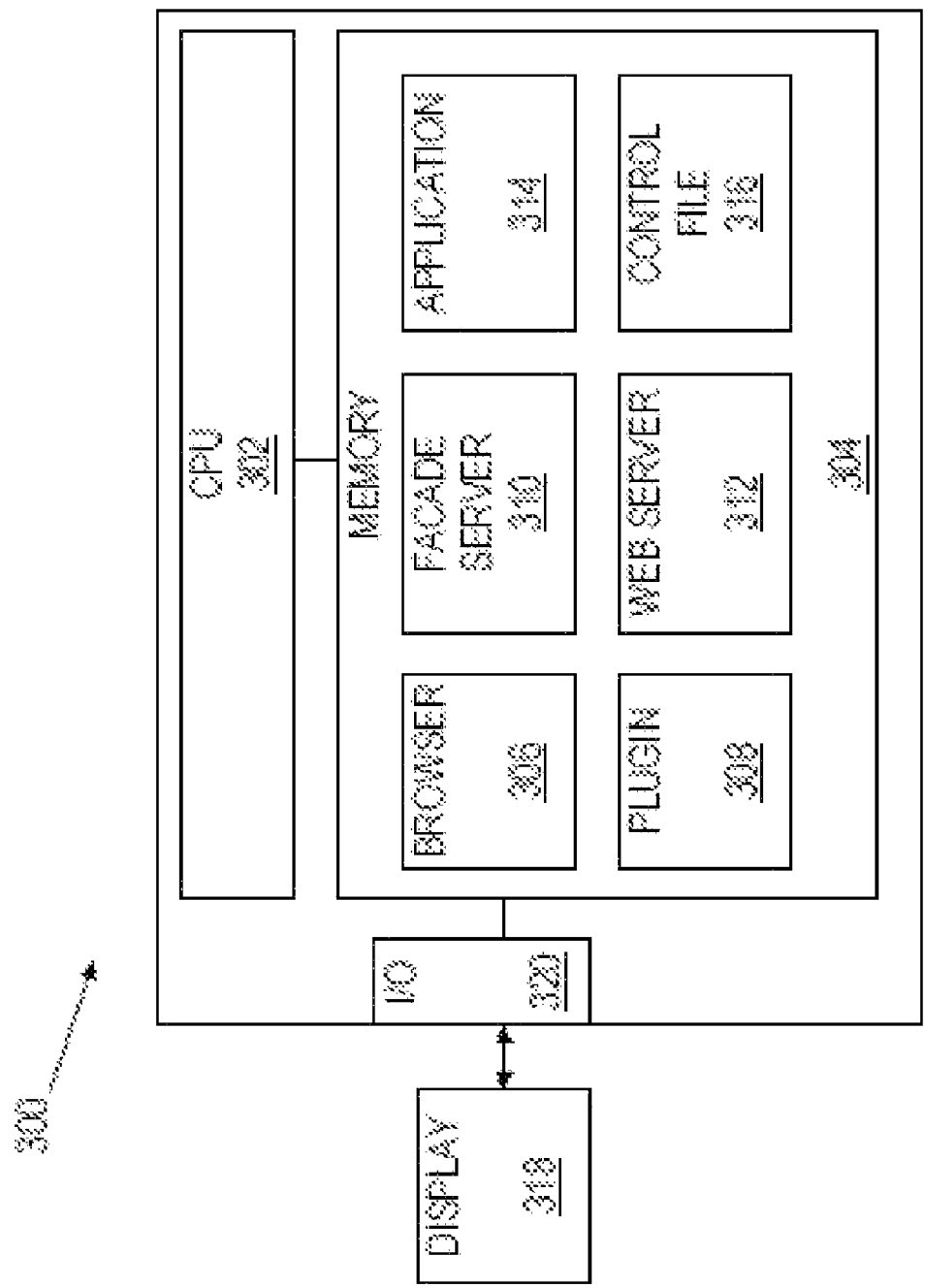
FIG. 3 illustrates a computer system that operates in two modes constructed in accordance with embodiments of the invention.

In alternative embodiments, a web-server may be employed in conjunction with the facade server 110 to host one or more applications in a local-only mode and a network mode. FIG. 3 illustrates a computer system constructed in accordance with these embodiments of the invention. System 300 may be any type of computer system, such as a laptop computer, a personal computer, or a stand-alone computer operated as a server. The system may comprise a single central processing unit (CPU) 302, as illustrated in FIG. 3, or may comprise a plurality of CPUs arranged in a configuration where parallel computing may take place. The CPU 302 may couple to a memory 304 that may store a browser 306 program, a plugin 308 program, a facade server 310 program, a web-server 312 program, and an application 314. In addition, a control file 316 that controls the operational mode of the system 300 is stored in the memory 304. The memory 304 may comprise volatile memory and/or non-volatile memory, such as random access memory (RAM), read only memory (ROM), and a hard drive.

While operating in the local-only mode, the facade server 310 may handle local requests from the plugin 308, as previously described. While operating in the network mode, the web-server 312 may handle local and remote requests. The mode of operation may be determined by a setting a flag in the control file 316. The browser 306 may be capable of rendering application data generated by the application 314 onto a display 318 via an input/output (I/O) interface 320.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system comprising:
   a central processing unit (CPU);
   a memory unit coupled to the CPU;
   an application stored in the memory unit and executable by the CPU;
   a facade server stored in the memory unit and executable by the CPU; and
   a program stored in the memory unit and executable by the CPU, wherein the program creates an interface between the facade server and a web-browser for exchanging data associated with the application,
   wherein the facade server hosts the application without utilizing network protocols and without opening network ports.

2. The system of claim 1 wherein the program interacts with the facade server through a local protocol registered on the system.

3. The system of claim 1 wherein the application comprises one of a plurality of applications hosted by the facade server without utilizing network protocols.

4. The system of claim 1 wherein the application, the facade server, and a web-server interface by which the application exchanges data with the facade server all utilize a common address space.

5. The system of claim 1 further comprising a web-server, wherein the web-server handles connections to the application when operating in a network mode, and the facade server handles connections to the application when operating in a local-only mode.

6. A computer-implemented method comprising:
generating application data from a web-based application hosted on an executable facade server via a web-server interface;
providing said application data from the executable facade server to a web-browser using a local protocol; and
using said web-browser to display said application data on a display,
wherein the executable facade server hosts the web-based application without utilizing network protocols and without opening network ports.

7. The method of claim 6 wherein the local protocol uses a data transfer mechanism selected from the group consisting of software component models, named data pipes, memory mapped I/O streams, data files, and a combination thereof.

8. The method of claim 6 wherein the web-based application generates the application data by utilizing a web-based technology selected from the group consisting of Perl, Java®, JavaScript®, active server pages (ASP), hypertext preprocessing (PHP), hypertext markup language (HTML), and a combination thereof.

9. The method of claim 6, wherein the web-based application, the facade server and the web-server interface all share a common address space.

10. The method of claim 6 further comprising: providing an executable web server for hosting data on a network; if operating in a network mode, using the executable web server to provide connections to the web based application; and if operating in a local-only mode, using the executable facade server to provide connections to the web based application.

11. A computer readable media storing instructions executable by a computer system, and when executed the instructions implement a method comprising:
generating application data from a web-based application hosted on an executable facade server via a web-server interface;
providing said application data from the executable facade server to a web-browser using a local protocol;
using said web-browser to display said application data on a display,
wherein the executable facade server hosts the web-based application without utilizing network protocols and without opening network ports.

12. The computer readable media of claim 11 wherein the local protocol uses a data transfer mechanism selected from the group consisting of software component models, named data pipes, memory mapped I/O streams, data files, and a combination thereof.

13. The computer readable media of claim 11 wherein the web- based application generates the applications using a web-based technology selected from the group consisting of Perl, Java, JavaScript, active server pages (ASP), hypertext preprocessing (PHP), and hypertext markup language (HTML), and a combination thereof.

14. The computer readable media of claim 11, wherein the web-based application, the executable facade server and the web server interface all share a common address space.

15. A computer system comprising:
means for executing programs;
means for storing data coupled to the means for executing programs;
means for generating application data from a web-based application,
wherein the web-based application is stored in the means for storing data and executable by the means for executing programs; and
means for hosting the web-based application, wherein the means for hosting the web-based application is stored in the means for storing data and executable by the means for executing programs; and
wherein a program executed by the means for executing programs interfaces the means for generating application data with means for viewing the application data; and
wherein the means for hosting the web-based application does not utilize network protocols and does not open network ports.

16. The system of claim 15 wherein the means for hosting the web- based application is capable of mimicking a plurality of web-servers.

17. The system of claim 15 wherein the web-based application comprises a plurality of web-based applications.

18. The system of claim 15 further comprising means for hosting data on a network, wherein the means for hosting data on a network is stored in the means for storing data and is executable by the means for executing programs; and wherein the means for hosting data on the network handles connections to the web-based application when the system is operating in a network mode, and the means for hosting web-based application without utilizing network protocols handles connections to the web-based application when operating in a local-only mode.

\* \* \* \* \*

UNITED STATES PATENT AND TRADEMARK OFFICE
CERTIFICATE OF CORRECTION

PATENT NO. : 7,472,398 B2 Page 1 of 1
APPLICATION NO. : 10/715250
DATED : December 30, 2008
INVENTOR(S) : Brian J. Corell et al.

It is certified that error appears in the above-identified patent and that said Letters Patent is hereby corrected as shown below:

In column 5, line 31, in Claim 10, delete "web server" and insert -- web-server --, therefor.

In column 5, line 32, in Claim 10, delete "web server" and insert -- web-server --, therefor.

In column 5, line 33, in Claim 10, delete "web based" and insert -- web-based --, therefor.

In column 5, line 35, in Claim 10, delete "web based" and insert -- web-based --, therefor.

In column 6, line 7, in Claim 13, delete "Java, JavaScript," and insert -- Java®, JavaScript®, --, therefor.

In column 6, line 12, in Claim 14, delete "web server" and insert -- web-server --, therefor.

Signed and Sealed this

Thirteenth Day of October, 2009

David J. Kappos
*Director of the United States Patent and Trademark Office*